United States Patent [19]

Maltiel

[11] Patent Number: 4,978,923
[45] Date of Patent: Dec. 18, 1990

[54] ELECTRICAL MEASUREMENTS OF THE PROFILE OF SEMICONDUCTOR DEVICES DURING THEIR MANUFACTURING PROCESS

[76] Inventor: Ron Maltiel, 933 Eichler Dr., Mountain View, Calif. 94040

[21] Appl. No.: 525,424

[22] Filed: May 17, 1990

Related U.S. Application Data

[62] Division of Ser. No. 343,755, Apr. 26, 1989.

[51] Int. Cl.$^5$ .................... G01R 27/02; G01R 31/26
[52] U.S. Cl. .................................. 324/693; 324/699; 324/716; 324/158 R; 437/8
[58] Field of Search ............... 324/602, 609, 691, 693, 324/697, 699, 704, 705, 715, 716, 719, 158 R, 158 P; 437/8

[56] References Cited

U.S. PATENT DOCUMENTS

| | | | |
|---|---|---|---|
| 3,974,443 | 8/1976 | Thomas | 324/716 |
| 4,101,830 | 7/1978 | Greig | 324/158 F |
| 4,103,228 | 7/1978 | Ham | 324/65 R |
| 4,218,649 | 8/1980 | Kutzavitch | 324/54 |
| 4,473,795 | 9/1984 | Wood | 324/54 |

*Primary Examiner*—Reinhard J. Eisenzopf
*Assistant Examiner*—Jack B. Harvey
*Attorney, Agent, or Firm*—Skjerven, Morrill, MacPherson, Franklin & Friel

[57] ABSTRACT

A method for measuring the width and profile of structures in a semiconductor wafer comprises the step of constructing test structures on the wafer shaped to function as moats for confining electrically conductive liquid. The moats have an elongated shape. By measuring the electrical resistance exhibited by the liquid within the moat, the dimensions of the moat and, thus, the other structures on the wafer can be measured. In an alternative embodiment, the conductive liquid is used to facilitate electrical contact to the various structures formed in the wafer.

4 Claims, 8 Drawing Sheets

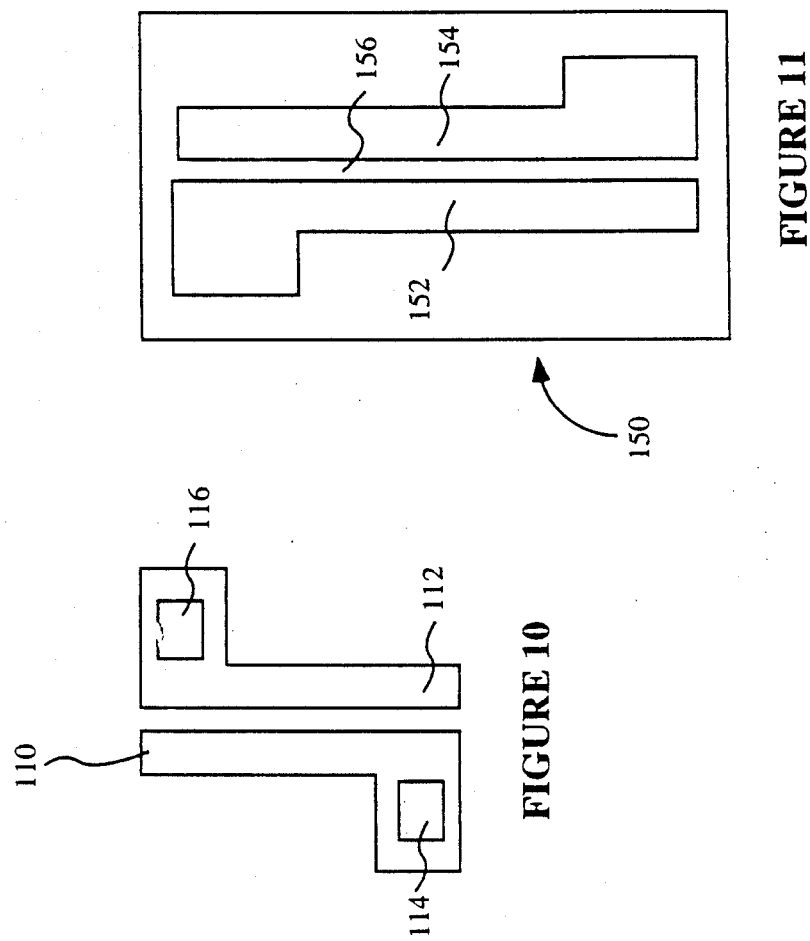

ELECTRICAL MEASUREMENTS OF THE PROFILE OF SEMICONDUCTOR DEVICES DURING THEIR MANUFACTURING PROCESS

This application is a division of application Ser. No. 07/343,755, filed Apr. 26, 1989.

BACKGROUND OF THE INVENTION

1. Field of the Invention

This invention relates to electrical measurements of semiconductor properties during the manufacturing process of integrated circuits and in particular to means for measuring the dimensions (e.g. lengths and widths) of structures in an integrated circuit.

2. Description of Prior Art

In-line measurements are an important method of controlling semiconductor fabrication processes. Such measurements enable a quick response to variations of fabrication process steps. (As used herein, "inline measurements" are measurements made during the fabrication process, i.e. prior to device completion.) Also the feedback from in-line measurements reduces the number of products damaged by defective processing through the fast detection of problems. One of the most important parameters to measure during production is the width of lines which form electrical elements in semiconductor devices.

A common sequence in semiconductor manufacturing is a deposition of a thin layer of a material such as polysilicon on a wafer followed by a deposition of a photoresist layer on top of the polysilicon. The photoresist is then exposed to light through a patterned photomask.

The transparent portion of the photomask permits passage of light which interacts with the photoresist. The photoresist is then developed and etched using a chemical that removes the exposed portion of the photoresist, thereby exposing a portion of the underlying polysilicon. Then, the exposed portion of the polysilicon layer is etched away, e.g. by reactive ion etching. It is very crucial to accurately control the width of the resulting polysilicon structure.

To achieve the required degree of control, both the photoresist and the final polysilicon line widths are monitored on a regular basis during the fabrication process. Currently in-line width measurements use optical techniques. However, there are several problems with such optical techniques, e.g. they cannot be used to accurately measure small structures with great precision. Also, optical measurements are not very reproducible, and are dependent on the person performing the measurements. Optical measurement techniques are also slow, difficult to automate, and it is difficult to integrate the optical data into a computerized data base.

It is also known in the art to perform electrical measurements on integrated circuits. Most electrical measurements are done only following fabrication, and can be done only on conductive structures. Further, electrical measurements on such structures can be done only following irreversible definition of the conductive layer used to build the structure. Further, the conductive layer to be measured cannot be covered by any nonconductive material such as oxide during the measurement.

Another very important parameter to control in semiconductor fabrication is the exact profile of lines being etched. If, for example, polysilicon is used as a gate electrode in an MOS transistor, the channel length of the transistor is determined by the profile of the polysilicon lines. Further, the planarity of the wafer surface is controlled by the profile of the structure formed therein. Currently line profiles are monitored by breaking wafers and examining the cross-section profile with a microscope.

SUMMARY OF THE INVENTION

A method for measuring the widths and edge profiles of structures in an integrated circuit in accordance with my invention is accomplished by in-line electrical measurements. These measurements are non-destructive and can be used to evaluate the dimensions of both nonconductive and conductive structures within the circuit.

In accordance with my invention, when a first structure is being constructed in an integrated circuit whose dimensions are critical, a second structure is formed concurrently with the first structure which serves as the walls of a moat. The moat is filled with an electrically conductive liquid which is electrically contacted. As described below, the electrical resistance of the liquid within the moat is measured, and this measurement is used to calculate the physical dimensions of the moat which in turn track the dimensions of the first structure.

In another embodiment, a method in accordance with my invention is used to measure the distance between a pair of structures in an integrated circuit. During this method, a test structure is formed concurrently with the pair of structures and serves as the walls of a moat. The moat is filled with an electrically conduct liquid which is electrically contacted. As described below, the electrical resistance of the liquid within the moat is measured, and this measurement is used to calculate the width of the moat, which in turn tracks the distance between the pair of structures.

In accordance with another embodiment of my invention, the liquid within the moat is used to facilitate electrical contact to under lying semiconductor regions so that the electrical properties of transistors, diodes, resistors or other devices within the circuit can be tested prior to completion of the circuit.

In accordance with yet another embodiment of my invention, the moat walls comprise conductive material such as polysilicon. An insulating layer such as an $SiO_2$ layer is formed on the top but not the sides of the conductive material. The conductive liquid is used to electrically contact the sides of the conductive material, so the electrical characteristics of the conductive material can be measured.

One benefit of my invention is that line widths of nonconductive or conductive materials, (such as oxides, photoresist or metal) can be electrically measured.

My invention also provides the ability to accurately measure line profiles of materials such as photoresist or polysilicon. The profiles can be a straight line profile, a concave profile or a convex profile.

Another major benefit is the fact that electrical properties can be measured very soon after a layer is defined during the fabrication process. For example, oxide capacitors can be evaluated before the top electrode is deposited. Similarly, semiconductor junction leakage currents can be measured immediately following the junction formation. Also, MOS transistors can be evaluated immediately following gate electrode definition but before formation of an electrical contact layer, and before contact pad formation. Since these measurements are all electrical they have the benefits of high accuracy, reproducibility, and speed. Further, these measurements can easily be integrated into a computerized data base.

BRIEF DESCRIPTION OF THE DRAWINGS

FIG. 10 illustrates in plan view a second test structure for detecting bridging in a semiconductor wafer.

FIG. 11 illustrates in plan view a structure for detecting openings in structures on a semiconductor wafer.

DETAILED DESCRIPTION

Figure 1:
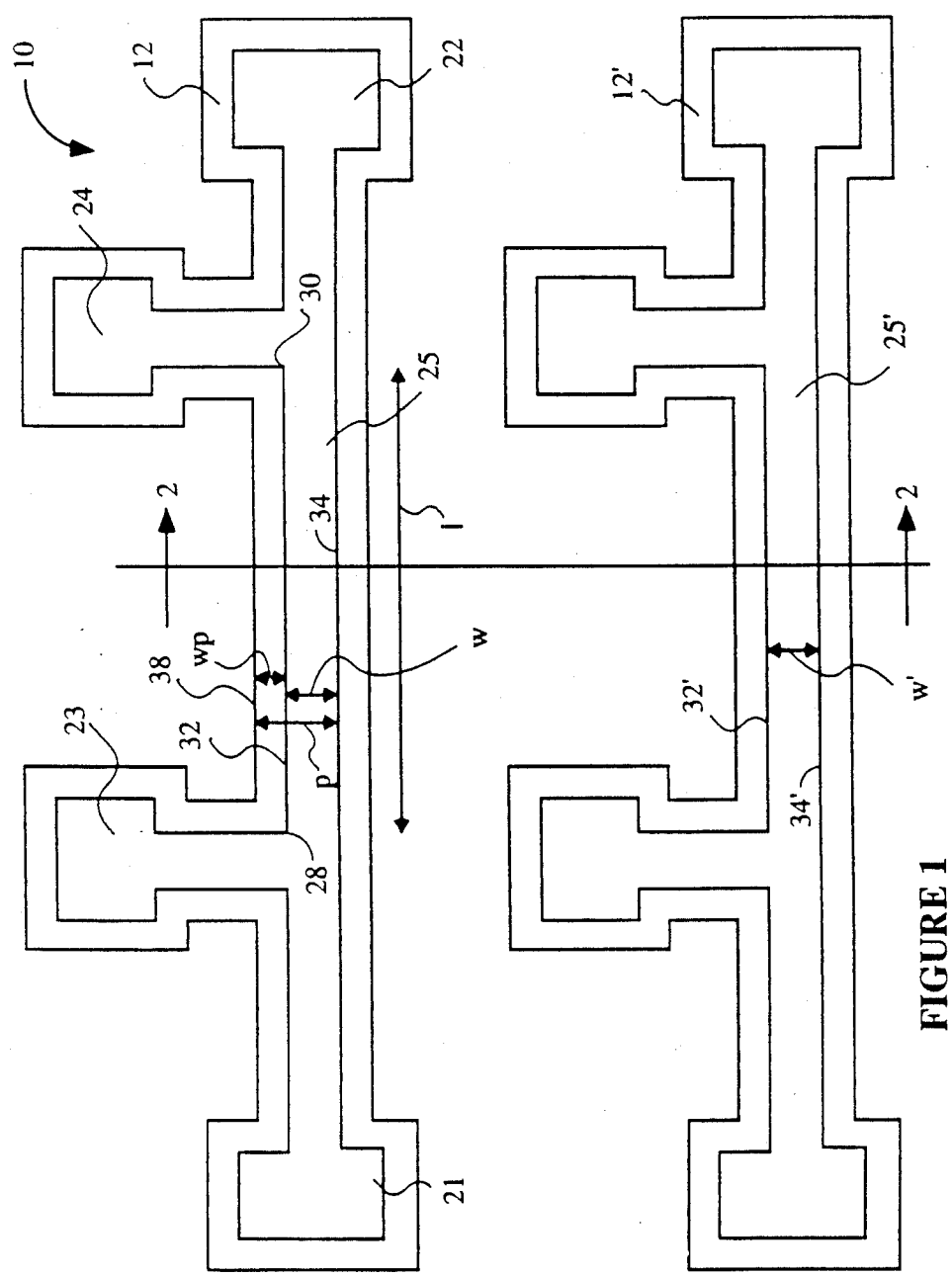
FIG. 1 is a top view of an example of a line width measurement structure comprising photoresist formed on a dielectric layer in accordance with the present invention.

Several embodiments of my invention are described below. These embodiments are merely exemplary. Those skilled in the art will appreciate that changes be made to the disclosed embodiments without departing from the spirit and scope of the invention.

A method in accordance with my invention permits measurements of the dimensions of structure in an integrated circuit. The method of the present invention also enables electrical in-line measurements during semiconductor circuit fabrication. The measurements can be integrated in the production flow without damaging the circuits being tested. Both nonconductive and conductive materials can be evaluated. One important application of the method is measurement of the widths and profiles of both conductive and nonconductive lines. Since the measurements are electrical they are accurate, reproducible, and fast. They also can be easily integrated into a computerized data base. One important feature of my invention is the measurement of device characteristics using a conductive liquid that serves as a contacting medium. In a typical measurement, initially the liquid is applied to a patterned wafer. The liquid conforms to the shape of the local patterns surrounding it. Thus, the liquid forms a confined lake having a shape determined by the structures previously formed on the wafer which confine the liquid. Since the liquid is conductive, the properties of the liquid having that specific confined shape can be measured. Alternatively, the liquid can be used to electrically contact the material surrounding the liquid or to electrically contact the layer beneath the liquid. The measurements are nondestructive since the conductive liquid is removed before any subsequent processing.

One example of a measurement method in accordance with my invention is used in a process for defining lines in a photoresist layer on top of an oxide-coated polysilicon layer. The process sequence typically starts with deposition of the photoresist layer on top of an oxide layer, which in turn is formed on a polysilicon layer. The photoresist is then exposed to light through a patterned photomask in a conventional manner. The transparent portion of the photomask permits light to pass therethrough in order to expose portions of the photoresist. The photoresist pattern is then defined using a chemical that etches away only the photoresist portions exposed to light. The oxide layer and polysilicon layer are then defined using the patterned photoresist as a mask. Only the portions of the oxide layer and polysilicon layer that are not covered by the photoresist will be etched away.

The line widths of patterns on the photomask are typically different from the line widths of the patterned photoresist. Further, the line widths of the polysilicon patterns are typically different from the photoresist line widths that serve as a mask which define the polysilicon lines. Those differences are due to the specific characteristics of the etching chemical used and the etching process parameters. It is desirable to be able to measure the line widths of the photoresist pattern and the polysilicon pattern during production.

The photoresist electrical line width measurements in accordance with one embodiment are done in the following way The photomask includes, in addition to opaque and transparent regions which are used to define desired polysilicon structures, an additional region which defines a test pattern 10 in photoresist 12 having a shape shown in plan view in FIG. 1 and in cross section in FIG. 2. The structure shown is of photoresist 12 on top of oxide layer 14, which in turn is formed on polysilicon 16. (Polysilicon 16 is formed on an oxide layer 18, which in turn is formed on a silicon substrate 20.) Photoresist structure 12 has a linear shape and includes four openings 21, 22, 23 and 24 that serve as contact pads and an elongated opening 25 that extends along the length of the photoresist structure. Pads 21, 22 are at the ends of photoresist structure 12. Pads 23, 24 are towards the middle of structure 12. The width w of opening 25 in photoresist 12 is measured in the following way. A conductive liquid 26 (FIG. 2) is applied to the top of the wafer and fills openings 21 to 25 in photoresist structure 12. In one embodiment, liquid 26 may be a solution comprising water and a surfactant such as Photo-Flo 200 manufactured by Eastman Kodak Co. of Rochester, N.Y. or Triton X100 manufactured by Mallinck Corp. of St. Louis, Mo. In addition, other conductive liquids may also be used. Then, four electrical probes are used to contact liquid 26 at pads 21, 22, 23 and 24. The resistance R of confined liquid 26 is determined by forcing current I between pads 21 and 22 and measuring the voltage drop V between pads 23 and 24. From Ohms law the resistance is $$R = V/I \tag{1}$$

The resistance R relates to the resistivity of liquid 26 and to the shape of confined liquid 26. Resistance R can be expressed as $$R = (r/t)*(l/w) \tag{2}$$

Where r is the resistivity of liquid 26, t is the depth of liquid 26 from its top surface to its bottom surface (the bottom surface coincides with the top surface of oxide 14), and 1 is the distance between corners 28 and 30 of edge 32 of photoresist 12 The width w is the distance between edges 32 and 34 of photoresist 12. Since length 1 is known and R can be calculated from equation (1), there are two unknown variables in equation (2), i.e. width w and the ratio r/t. One way of determining w and r/t is by forming a second photoresist structure 12' on the wafer concurrently with photoresist 12 having a shape identical to that of photoresist 12 except that the elongated opening 25' of the second structure has a width w' that is different from width w. In first structure 12, the mask drawn distance between edges 32 and 34 equals W1. (As used herein, mask drawn distances are the distances between the edges of opaque regions on the photomask. As mentioned above, the mask drawn distances are usually different from the corresponding distances in the photoresist structure defined by the photomask.) In second photoresist structure 12', the mask drawn distance between edges 32' and 34' equals W1'.

Equation (2) refers to the actual dimensions w, 1 of photoresist structure 12. However, due to semiconductor processing, dimensions w, w' are different from mask drawn dimensions W1, W1'. Specifically, the widths w, w' of photoresist structures 12, 12' are smaller by a distance s than the corresponding mask drawn distance for both structures. Equation (2) can be rewritten in terms of mask drawn distances W1, W1' adjusted for process shifting by subtracting the process shift distance s from the mask drawn width. The resistance of liquid 26 in each structure can thus be represented by the following equations $$R1 = (r/t)*(1/(W1-s)) \quad (3)$$

$$R2 = (r/t)*(1/(W1'-s)) \quad (4)$$

Since R1 and R2 can be measured and 1, W1, W1', are known equations (3) and (4) can be solved for s. Width w between edges 32 and 34 of photoresist 12 can be found by subtracting the process shift distance s from the mask drawn width W1.

From width w, we can find the photoresist line width wp. The process shift changes width wp between edges 32 and 38 of photoresist structure 12 from the corresponding mask drawn width. As mentioned above, the process shift also changes width w between edges 32 and 34 from the corresponding mask drawn width. However, the pitch p between edges 34 and 38 can be maintained to be the same both on the photomask and on photoresist 12. The photoresist line width wp can be calculated by subtracting width w between edges 32 and 34 from pitch p between edges 34 and 38.

The width wp of photoresist 12 tracks the width of photoresist elsewhere on the wafer. In addition, width w tracks the distance between photoresist structures elsewhere on the wafer. Thus, photoresist 12, 12' can be used to measure the widths of and distances between photoresist structures elsewhere on the wafer.

It will be appreciated by those skilled in the art that although the above description pertains to photoresist in which the exposed portions of the photoresist are removed during the manufacturing process (i.e. positive resist), the above-described method is also applicable to photoresist in which the unexposed portions of the photoresist are removed during manufacturing (i.e. negative resist). This method can also be used to measure dimensions of structures of materials other than photoresist.

Figure 2:
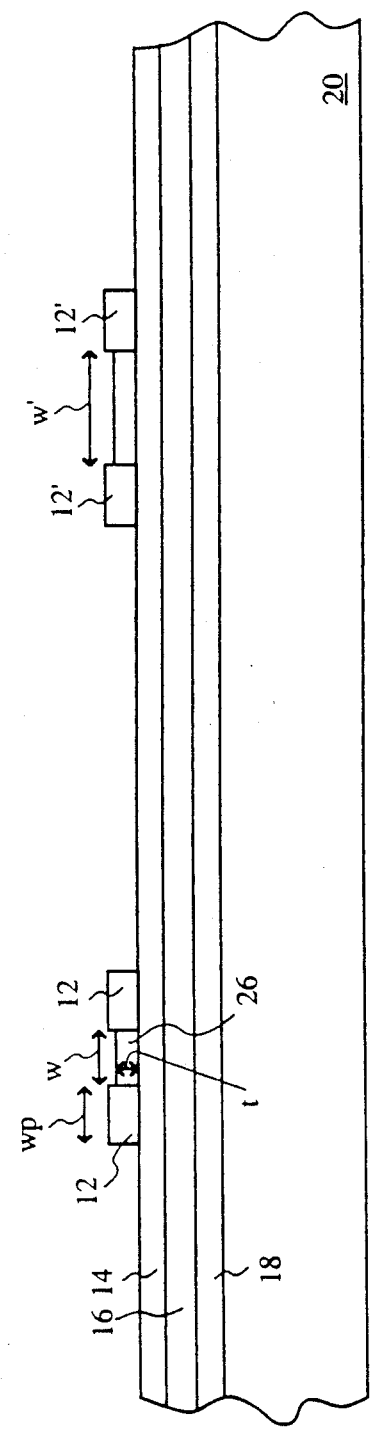
FIG. 2 is a cross-section view along line 2—2 of the line width measurement structure of FIG. 1.
Figure 3:
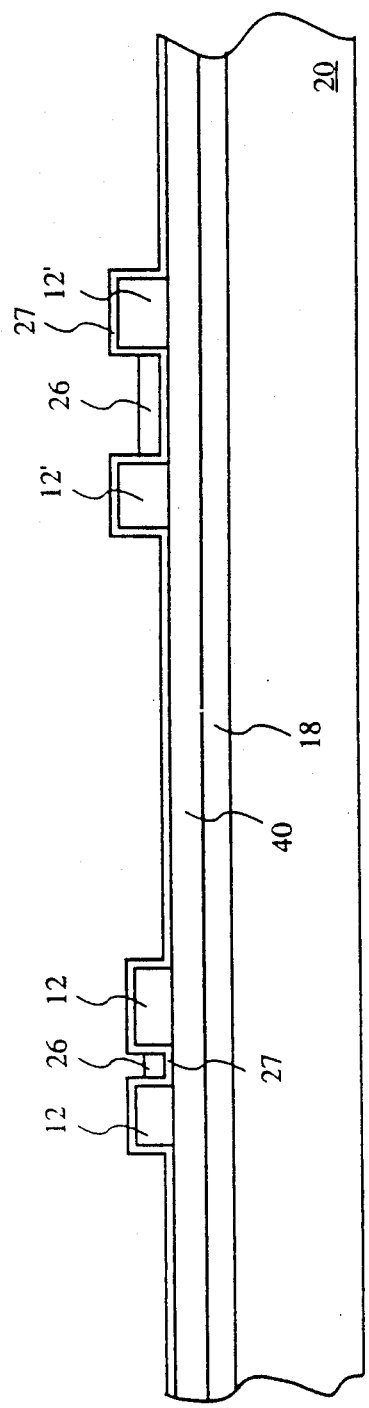
FIG. 3 is a cross-section view of a structure having the same shape as that of FIG. 1 along line 2—2, except that the photoresist is formed on a conductive layer.

The measurements described in relation to FIGS. 1 and 2 are applicable to photoresist on top of dielectric material (oxide 14). For a case of photoresist on top of metal such as metal 40 (FIG. 3), a pair of liquid layers 26, 27 are used. The top liquid layer 26 is conductive and the bottom liquid layer 27 is nonconductive. Nonconductive liquid 27 insulates top conductive liquid 26 from underlying metal 40. The electrical measurements of liquid 26 in FIG. 3 are performed as described above, i.e., the electrical resistance of liquid 26 confined by photoresist 12, 12' is measured, and distances w and wp are calculated. Liquid 27 prevents metal layer 40 from distorting the electrical resistance measurement of liquid 26.

The width of a conductive line such as a metal line on top of a dielectric layer is measured in a manner similar to that discussed in reference to FIG. 3. Specifically, initially a thin layer of nonconductive liquid uniformly coats all the exposed surfaces of the structure to be measured A conductive liquid is then deposited on top of the first liquid. As in the previously described embodiment, the conductive liquid may be a solution of water and a surfactant, and the nonconductive liquid can be a liquid polymer. In yet another embodiment, instead of using non-conductive liquid 27, some other non-conductive material may be applied to the wafer, e.g. a solid material deposited by vacuum deposition or other technique.

Figure 4:
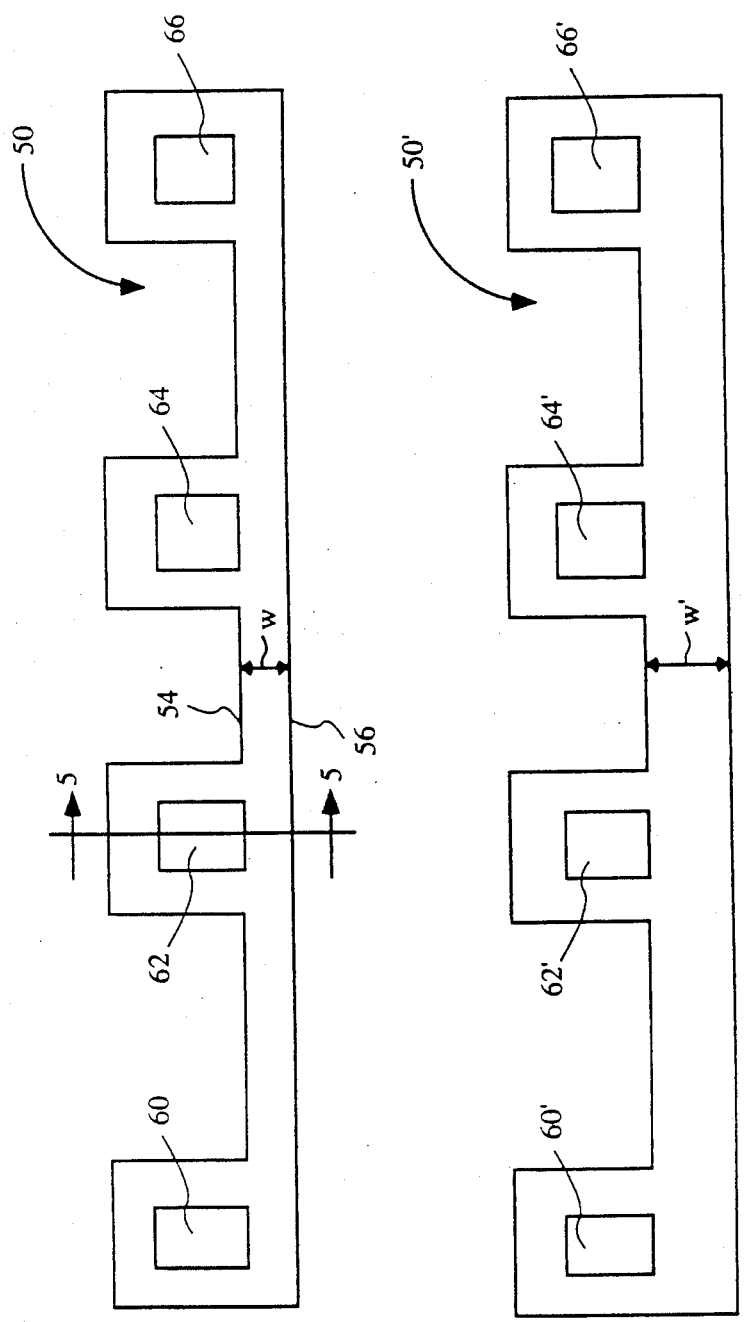
FIG. 4 is a top view of a line width measurement structure in accordance with another embodiment of the present invention.
Figure 5:
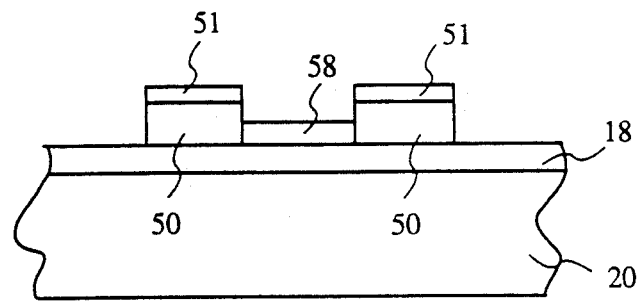
FIG. 5 is a cross section view along line 5—5 of the structure of FIG. 4.

A method in accordance with a third embodiment of my invention permits direct measurement of a conductive line width by contacting the conductive line from the side, rather than from the top. This option is useful for measuring conductive lines covered by a dielectric layer. An example of such a structure is polysilicon structure 50 covered by oxide 51 shown in plan view in FIG. 4 and in cross section in FIG. 5. In this example, it is desired to measure the width w of structure 50 between edges 54 and 56. Conductive liquid 58 is injected into contact pad openings 60, 62, 64, and 66. Also in this case a second polysilicon structure 50' having a shape shown in FIG. 4 is also measured. The only difference between structure 50 and 50' is that width w in structure 50 is less than width w' of structure 50'. Using equation (1) the resistance of polysilicon is determined by applying current between pads 60 and 66 and measuring the voltage drop between pads 62 and 64. Using equations (3) and (4), the line width w of the conductive line on the wafer is calculated.

In this embodiment, structures 50, 50' do not contain an elongated opening similar to opening 25 of FIG. 1 to contain conductive liquid 58. Rather, liquid 58 is only formed at openings 60 to 66 and 60' to 66' and is used to facilitate electrical contact to oxide-covered polysilicon 50, 50'. It is the electrical resistance of the polysilicon in structures 50, 50' that is measured in this embodiment. The term R in equations 1 to 4 refers to the resistance of the polysilicon in this embodiment.) It is noted that if liquid 58 were not used in this embodiment, oxide 51 would make electrical contact of structures 50, 50' difficult or impossible.

It is noted that the liquid 58 in openings 60 to 66 exhibits some electrical resistance. However, the voltage measurement probes which contact the liquid in openings 62 and 64 exhibit high input impedance, and therefore the current through the liquid in openings 62 and 64 is minimal, and thus the effect of the liquid resistance on the resistance measurement of structures 50, 50' is minimal.

In the above-described embodiment, it is important to control the amount and the uniformity of the liquid deposited on the wafer. The conductive and nonconductive liquids of the above embodiments can be coated on the test structures by several methods. One method is to deposit the liquid from a dispenser above a rotating wafer at high speed. The rotation speed will determine the liquid thickness on the wafer. Another method is to spray the wafer with the liquid. Alternatively, the liquid can be coated on the wafer by dipping the wafer in a liquid bath and pulling it out at a controlled rate. Also, the liquid can be injected on selected portions of the wafer through a syringe.

Figure 6:
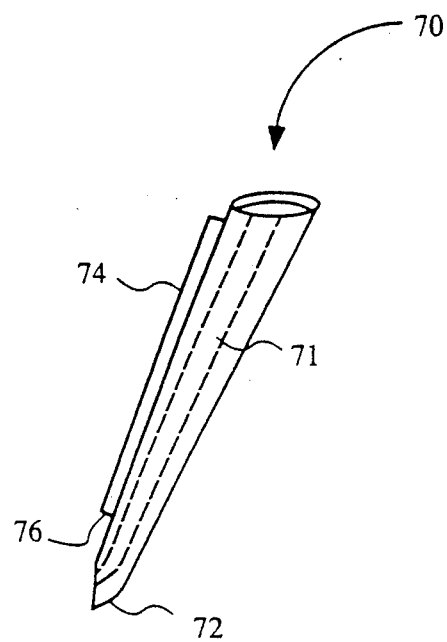
FIG. 6 illustrates a liquid dispensing syringe in accordance with the present invention.

Contact to the liquid can be made using a probe card having metal probes contacting the top surface of the liquid. In the alternative, the liquid dispensing syringe can be used both to inject the liquid and to electrically connect the liquid to measuring apparatus. In such an embodiment, the syringe can include a conductive lead for direct electrical connection to electrical measurement apparatus as shown in FIG. 6. The body of the syringe 70 is a long hollow cylinder made from a nonconductive material. The cylinder contains a lumen 71 which transports the conductive liquid from a reservoir (not shown) to the wafer surface. It is important to construct syringe 70 and its tip 72 from materials such that tip 72 will not penetrate the layer underneath the liquid. This can be accomplished by constructing the body of syringe 70 from a soft material. In addition, tip 72 can be gently curved to minimize the risk that syringe 70 will damage the structures thereunder by mechanical contact.

On one side of the syringe 70 is a strip of a conductive material 74 which contacts the liquid on the wafer, and is electrically connected to the electrical measurement apparatus. The bottom edge 76 of conductive strip 74 should be elevated relative to the bottom of syringe tip 72. This is done so that if syringe 70 is used in conjunction with a test method as discussed in relation to FIG. 3, edge 76 of conductive strip 74 will not extend through nonconductive liquid 27 and contact the underlying metal.

In another embodiment, instead of using conductive strip 74 to contact the liquid, the reservoir within the syringe is electrically contacted, which electrically contacts the liquid in lumen 71, which in turn contacts the liquid on the wafer surface. Thus, electrical connection to the liquid on the wafer surface is made by contacting the liquid in the syringe reservoir.

Figure 7:
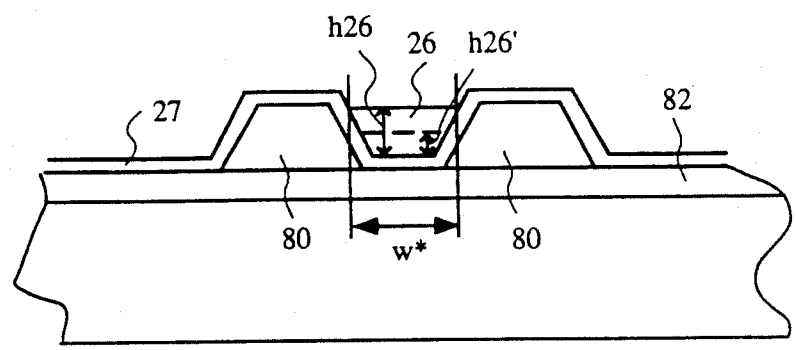
FIG. 7 is a cross-section view of a structure having the same shape as that of FIG. 1 along line 2—2 of FIG. 1 during profile measurements in accordance with the present invention.

Measuring the profile of lines on a wafer is another important application of my invention. Suppose, for example, it is desired to measure the profile of photoresist 80, formed on metal 82, which has the cross section profile shown in FIG. 7 and a shape as shown in FIG. 1. In this case, thin nonconductive liquid 27 is injected onto the wafer as shown in FIG. 7 such that liquid 27 coats the wafer surface. Then conductive liquid 26, thicker than liquid 27, is injected onto the wafer. The resistance of liquid 26 is then measured as discussed above. When calculating the profile of photoresist 80, a more generalized form of equation (2) may be used as follows:

$$R = rl/A \qquad (5)$$

where A is the cross-section area of liquid 26, r is the resistivity of liquid 26, and 1 is as illustrated in FIG. 1. Area A is a function of the amount of liquid 26 confined by photoresist 80. If first and second resistance measurements are made in which a first and second amount of liquid 26 are confined by photoresist 80 (e.g. wherein the height of liquid 26 equals h26 during the first measurement and h26' during the second measurement), the difference in measured resistance depends on the difference in cross-section area A of liquid 26 during the measurements, which in turn depends on width w* and height difference h26-h26'. The resistance measurements are repeated under conditions in which smaller amounts of liquid 26 are present on the wafer. By repeating the sequence of measurements for several liquid heights, distance w* as function of height h26 can be determined, and thus the profile of photoresist 80 can be determined.

There are several methods for varying liquid height h26 between measurements. One method is by using a conductive liquid which has a high (and known) evaporation rate. Thus, liquid 26 is deposited on the wafer, and permitted to evaporate at a known rate. Periodically, electrical resistance measurements are taken. Thus, height h26 decreases with time, and resistance measurements may be taken for various heights h26.

Another method is to start with a thin layer of conductive liquid 26 and gradually increase its thickness between measurements by injecting additional conductive liquid onto the wafer. Alternatively, a thin conductive liquid can be formed on the top of the wafer, and the thickness of h27 of nonconductive liquid 27 beneath it can be varied. The thicknesses h26, h27 can be varied by either adding to or reducing from the amount of liquids 26, 27 present on the wafer. It is noted that nonconductive liquid 27 is only needed for measurements involving conductive lines or to measure a line formed above a conductive layer. For a nonconductive line on top of nonconductive layer, the profile can be measured by using only a conductive liquid and varying its thickness between resistance measurements.

In another embodiment, instead of depositing liquids 26 and 27 in separate steps, liquids 26 and 27 are mixed and applied to the wafer surface. Then, liquid 27 settles out of solution and forms a separate non-conductive layer.

A method in accordance with my invention can also be used to detect bridging between structures on a wafer. In one embodiment, a test structure 100 (FIG. 9a) includes openings 101, 102 joined by a channel 104, which typically follows a tortuous path. The material 100a, 100b surrounding openings 101 to 104 may be photoresist, a dielectric material, or a conductive material. If structure 100 is formed from conductive material (e.g. metal or polysilicon), a pair of liquids (one being conductive, the other being non-conductive) should be used as described above.

Figure 9B:
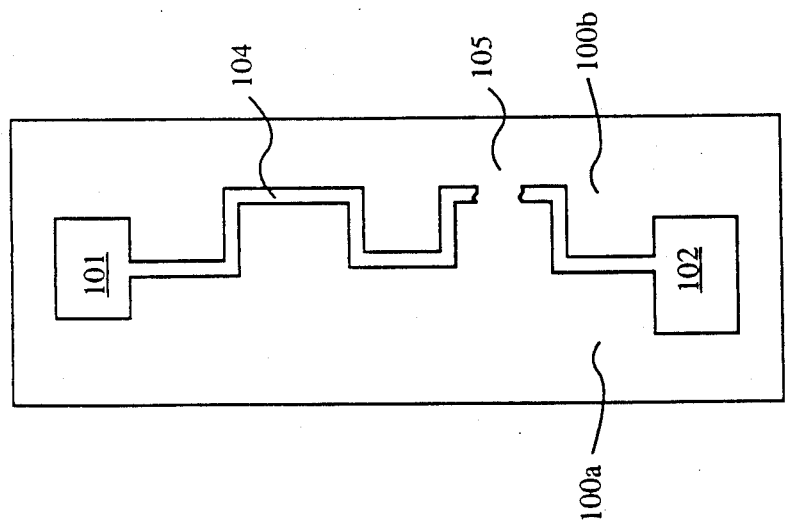
FIGS. 9a and 9b illustrate in plan view a first test structure for detecting bridging in a semiconductor wafer.
Figure 9A:
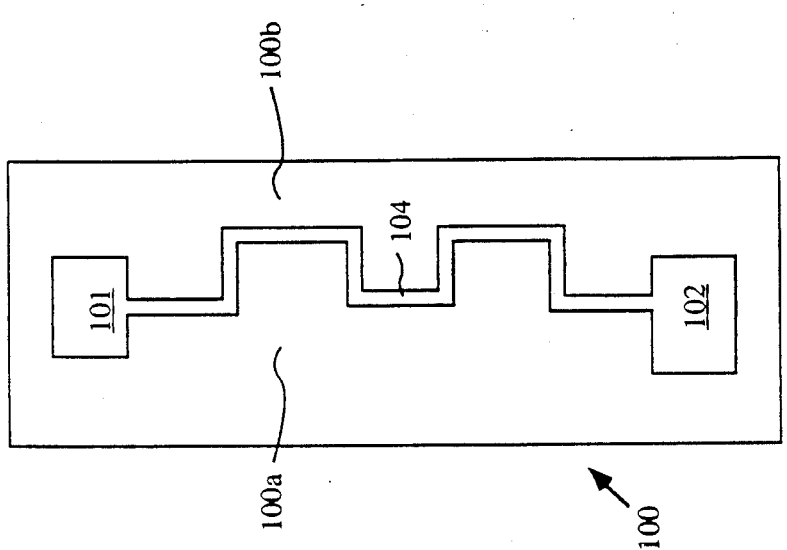

A voltage is applied across the conductive liquid in openings 101 and 102. If current flows between openings 101 and 102 it can be determined that there is no bridging between the material 100a on one side of opening 104 and material 100b on the other side of opening 104. However, an absence of current flowing between openings 101, 102, means that bridging 105 between material 100a, 100b has occurred, e.g. as illustrated in FIG. 9b. This would be indicative of bridging elsewhere on the wafer, and would therefore indicate that the wafer should be re-worked.

FIG. 10 illustrates another structure used to measure bridging In FIG. 10, conductive structures 110 and 112 include openings 114 and 116, respectively, for receiving conductive liquid. A voltage is applied across the liquid in openings 114, 116, and if current flows between openings 114, 116, then bridging is present, whereas if current does not flow between the liquid in openings 114, 116, bridging is not present. Bridging in structure 100 or between structures 110, 112 is typically indicative of bridging in other structures concurrently formed elsewhere on the wafer and thus detection of bridging indicates that the wafer may have to be re-worked.

FIG. 11 illustrates a test structure 150 in accordance with my invention for detecting undesired openings in structures on a semiconductor wafer. Referring to FIG. 11, structure 150 includes openings 152 and 154 separated by a wall 156. Electrically conductive liquid is introduced into openings 152, 154, a voltage is applied across the liquid in openings 152, 154, and current is measured through the liquid to detect openings in wall 156. The presence of an opening in wall 156 is indicative of the possible presence of openings in other structures formed concurrently with structure 150 elsewhere on the wafer (not shown), and thus may indicate whether the wafer needs to be re-worked.

Figure 8:
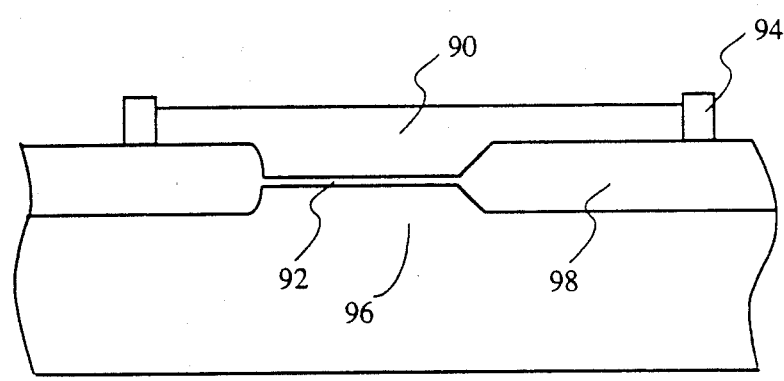
FIG. 8 is a cross-section view of conductive liquid extending over a thin oxide layer.

A process in accordance with my invention can also be used for other electrical measurements. Forming pools of conductive liquid on a wafer can be used to measure device parameters following the device formation but before metal contacts are formed. For example, in one embodiment, a conductive liquid pool 90 (FIG. 8) is formed above a dielectric layer 92 such as an oxide layer, and the breakdown voltage of dielectric layer 92 can be measured by application of an appropriate voltage to liquid 90. (The liquid can be laterally confined by a photoresist moat 94 or other structure). In addition, the capacitance between conductive liquid 90 and conductive material 96 below dielectric layer 92 can be measured. This process can be used to measure the characteristics of an oxide capacitor or a gate insulation layer.

In one embodiment, photoresist moat 94 may be constructed so that the conductive liquid pool also extends over thick field oxide 98. Advantageously, by contacting conductive liquid 90 above field oxide 98, there is little danger that the gate oxide or capacitor oxide 92 will be contacted and damaged by a probe.

The conductive liquid can also be used to electrically contact underlying semiconductor regions to determine semiconductor junction characteristics following junction formation of a diode. Additionally, pools of conductive liquid (confined by moats) may be formed above the base, emitter and collector of a bipolar transistor to facilitate measurement of transistor characteristics such as the transistor beta, breakdown voltages and leakage currents. (Bipolar transistors are discussed in U.S. Pat. No. 4,721,682, issued to Graham et al. and incorporated by reference.) The conductive liquid can also be used to contact a MOS transistor to measure MOS transistor characteristics following formation of source, drain, and gate regions.

As mentioned above, the conductive liquid can be used to measure defect density following photoresist or conductive layer definition, or to detect bridging or openings between photoresist or conductive lines.

While the invention has been described with regard to specific embodiments, those skilled in the art will recognize that changes can be made in form and detail without departing from the spirit and scope of the invention. For example, when depositing the conductive liquid on the wafer, instead of merely providing a very thin layer which is laterally confined by the various structures formed on the wafer, a thicker conductive layer may be formed on the wafer which covers the entire wafer surface. Then, the liquid is permitted to partially evaporate so that only small lakes of conductive liquid confined by the various structures on the wafer remains. The point in time when an appropriate amount of liquid remains can be determined by measuring the electrical resistance between the contact pads of the moats which form test structures. After a dramatic drop in the electrical resistance, it can be assumed that the height of the liquid no longer extends above the moats that are designed to confine the liquid. Accordingly, all such changes come within the present invention.

I claim:

1. Method for measuring the profile of structures comprising the steps of:
    forming a structure on a substrate, said structure having an opening therein for receiving electrically conductive liquid;
    introducing said electrically conductive liquid into said opening;
    measuring the electrical resistance of said electrically conductive liquid in said opening;
    varying the amount of electrically conductive liquid in said opening after said step of measuring and
    measuring said electrical resistance of said liquid after said step of varying.

2. Method of claim 1 wherein said step of varying comprises the step of permitting said electrically conductive liquid to evaporate between said steps of measuring the electrical resistance.

3. Method of claim 1 wherein said step of varying comprises the step of adding additional electrically conductive liquid into said opening between said steps of measuring the electrical resistance.

4. Method of claim 1 wherein said structure is electrically conductive, said method further comprising the step of covering said structure with an electrically insulating material prior to said step of introducing.

* * * * *